United States Patent [19]
Kain

[11] 3,747,763
[45] July 24, 1973

[54] FLUID TREATING SYSTEM

[76] Inventor: Calvin L. Kain, c/o J. E. Phillips, 2716 Warwick Ct., Bartlesville, Okla. 74003

[22] Filed: June 1, 1971

[21] Appl. No.: 148,798

[52] U.S. Cl.................. 210/181, 210/257, 210/321
[51] Int. Cl............................................. B01d 31/00
[58] Field of Search...................... 210/23, 321, 257, 210/181

[56] References Cited
UNITED STATES PATENTS

| | | |
|---|---|---|
| 1,825,631 | 9/1931 | Horvath.......................... 210/321 X |
| 3,456,803 | 7/1969 | Rak................................ 210/321 X |
| 3,526,320 | 9/1970 | Kryzer............................ 210/257 X |
| 3,550,782 | 12/1970 | Veloz............................. 210/257 X |

*Primary Examiner*—Frank A. Spear, Jr.
*Attorney*—Jack E. Phillips

[57] ABSTRACT

An automatic system is provided for the conversion of ordinary tap water to pure water which comprises, in combination, an osmotic purification means and a volume-controlled liquid storage means having suitable means in association therewith for the introduction of water to the purification means and for the transfer to and removal of water from the liquid storage means.

15 Claims, 5 Drawing Figures

INVENTOR.
CALVIN KAIN

FLUID TREATING SYSTEM

Demands on minicipal water treating systems continue to grow daily due to such factors as increased comsumption caused by population increase and increased pollution of available water sources. The growth in demand for consumable water and the continuing reduction in its availability have resulted in the incapability, in many instances, of community water systems to provide a consumable, totally contaminant-free water supply for either the domestic or the industrial comsumer. in some communities, it has even become necessary to recycle water, and such water, while perhaps meeting minimum health requirements, is often unpalatable to the consumer either because of the contaminants still present in the water or because of the adverse taste created by the various chemicals used to treat the water prior to its dispersion through the water supply system to the ultimate consumer. Accordingly, in many localities there remains the problem of providing a consumable, essentially contaminant-free, readily available supply of water.

It is thus an object of the present invention to provide an automatic water purification, storage and dispensing system. Another object of the invention is to provide a system wherein tap water is automatically converted to an essentially contaminant-free water. A further object is to provide a system which conveniently provides a ready source of essentially contaminant-free water.

Other objects, aspects and the several advantages of the invention will be apparent from the specification, claims and the appended drawings, of which:

In accordance with this invention, there is provided a water purification-storage-dispensing system which supplies a readily available source of consumable water. More specifically, in accordance with the present invention it has been discovered that consumable, palatable water can be readily supplied by treating tap water in a system which comprises first pretreating the water in an osmotic treating unit to remove the contaminants therefrom, followed by storage of the resulting pretreated water in a fluid storage zone which is so adapted as to provide for the continuous storage and dispersion of the water based upon consumer demands.

Figure 1:
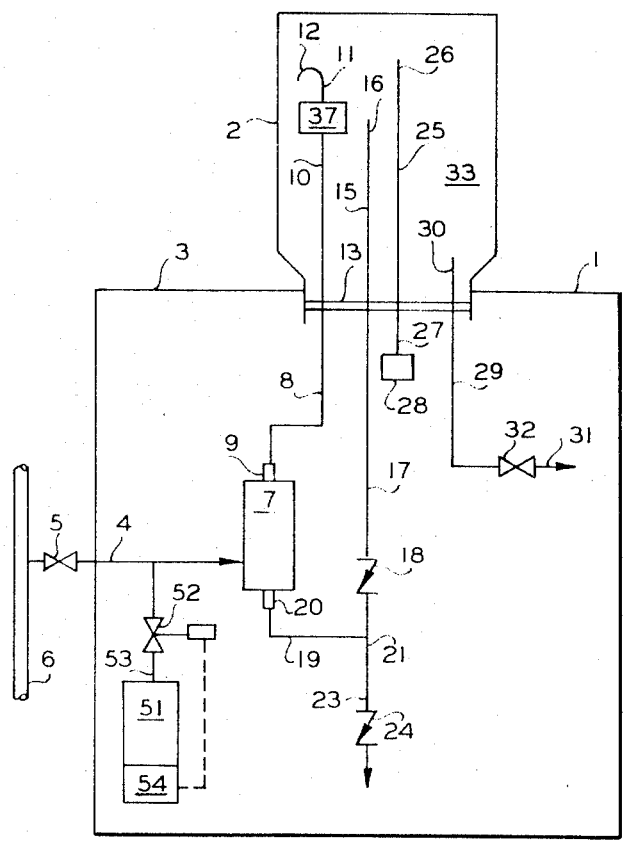
FIG. 1 is a diagrammatic view of the water treating system of the invention.

As shown in FIG. 1, which represents a diagrammatic view of the system of the invention, cabinet member 1 has a fluid storage container 2 positioned at and supported by the upper end 3 thereof. Conduit 4 having valve 5 therein is connected to a fluid source 6 such as a domestic water line and an osmonic treating unit 7. Conduit 8 connects outlet 9 of the osmotic treating unit 7 and essentially vertically disposed tubing 10 (which can have a curved outlet portion 12 as shown at its upper end 11) to provide for flow of water from unit 7 to the inside of the fluid storage container 2.

Conduit 10 is retained in a rigid upright position by means of support-seal member 13 which additionally serves to form a seal on the mouth 14 of fluid storage container 2. Conduit 15, which is similarly held in a rigid upright position by means of support-seal member 13, terminates at its upper end 16 slightly below outlet portion 12 of conduit 10 and continues downward so that its lower end 17 terminates in check valve 18 so as to provide an overflow system to prevent introduction of excess water into fluid container 2. Conduit 19 connects outlet 20 of the osmotic treating unit 7 and check valve 18 to permit the removal of excess water from unit 7. Conduit 21 connects with its first end 22 tee valve 18 and via its second end 23 to check valve 24 and any drain system (not shown). Check valve 24 serves to prevent backflow from the drain system into the overall system as shown. Conduit 25, having an upper end 26 disposed with fluid container 2 and termining at a point above the outlet 12 of conduit 10, serves to introduce air into fluid container 2. The lower end 27 of conduit 25 terminates at a point below seal member 13 and has associated therewith a filter member 28 which serves to prevent the introduction of foreign matter into fluid storage container 2. Conduit 29, having an upper end 30 disposed with the lower section of fluid container 2 and supported by seal member 13, has provided near its outlet end 31 valve member 32 which permits the withdrawal of fluid from fluid storage zone 33 defined by fluid container 2.

In operation, water from source 6 such as a municipal water tap is passed, upon the opening of valve 5, through conduit 4 to the inlet member of the osmotic treating unit 7. Following treatment of the water by passage thereof through osmotic unit 7, in the manner described in connection with FIG. 2, the resulting essentially contaminant-free water passes through outlet 9 and conduit 8 to upright conduit 10 from which it is introduced via outlet 12 into a fluid storage zone 33 defined by fluid storage container 2. When the water level reaches the upper end 16 of conduit 15, excess water flows through conduit 15 to check valve 18, conduit 21, check valve 24 and thereafter into a suitable drain conduit. Air is introduced through filter means 28 and conduit 25 and out upper end 26 thereof to effect equalization of pressure in the storage system when valve 32 is opened. The fluid is dispensed from zone 33 by activation of valve 32 disposed in conduit 29, which permits flow of water from inlet end 30 of conduit 29 through outlet end 31.

While fluid container 2 is illustrated as a glass member such as a conventional type of bottle for water storage, it is intended to be within the scope of this invention to utilize any type of confining elements or members to form a fluid storage zone 33. Accordingly, suitable means for fluid container 2 can be formed of plastics such as polyvinylchloride, polypropylene, polyethylene and the like, as well as rust-resistant metals such as stainless steel. Thus, the nature of the material defining zone 33 is not considered critical to the formation of the overall system of this invention, except, of course, that such materials should not impart contaminants to the system. Similarly, while seal member 13 is illustrated as a plugging device to securely close the mouth 14 of container 2 when it is a bottle, it is obvious that other members providing for passage of conduits 25, 10, 15 and 30 can be employed. Thus, container 2, if formed of a plastic, can have sealing means 13 formed integrally with the mouth portion 14 thereof and adapted to permit passage and support of the upright conduits therethrough. Similarly, when container 2 defining zone 33 is formed of a metal, seal 13 can be formed of the same material and can be readily modified or adapted to permit passage and support of the necessay conduits therethrough. It is preferable, however, that seal 13 be removably associated with zone 14 of container 2 in order to permit its ready opening for periodic cleaning and/or replacement of container means 2 as may be required.

Further, while cabinet member 1 is illustrated as terminating at its upper end 3 at a point adjacent seal means 13, if desired the cabinet housing can be extended upwardly to totally enclose container 2. In this form, suitable access means can be provided such as a removable top or side doors to permit ready access to container 2 for such inspection and/or servicing as required. Likewise, appropriate access means are provided for inspection and/or servicing of the lower portion of the system positioned below fluid storage zone 33.

While valve member 5 is shown to be outside cabinet member 1 so as to permit ready access thereto, should the total system need to be closed down, it can alternatively be positioned in conduit 4 at a point inside cabinet member 1. In addition, a double valve system can be employed to conveniently permit attachment to the water source and automatic control of flow as hereinafter described.

As a further alternative system to prevent overflow of zone 33 and optionally to eliminate the necessity for overflow conduit 15 in the system, a liquid level control means 37 can be installed within storage zone 33 in operable association with valve 5 so that when the level of fluid in container 2 reaches a predetermined height, valve 5 is closed until the level in container 2 falls below a predetermined level, thereby effecting the opening of valve 5 and permitting further flow of water into osmotic treating unit 7 and ultimately into storage zone 33 via conduit 10.

In a presently preferred embodiment, conduit 10 terminates in a curved portion as shown so that flow through conduit 10 is dropped downwardly through outlet 12 into zone 33. However, while preferred, a curved portion in conduit 10 is not essential, so that flow can enter one 33 directly from and uppr end 12 of conduit 10 on any configuration.

In a still further embodiment of the invention, a small liquid level controller 37 can be installed, as shown, in conduit 10 at the upper end 12 thereof which is so adapted as to terminate fluid flow through conduit 10 when the desired fluid level in fluid storage zone 33 is attained. Use of such a liquid level controller, which can be of the common ball or float type, will permit optional omission of overflow conduit 15. In addition, valve 5 can be eliminated or left in an open position so long as the total system is to be maintained in a stationary condition, since unnecessary flow of water from the source 6 will be prevented by liquid level controller 34. While it has been indicated that overflow conduit 15 can optionally be omitted, it is preferred to retain this conduit in the system as a further safety factor in the event of failure of the liquid level controller 34 or the occurrence of a surge of fluid through the fluid container zone 33.

Figure 2:
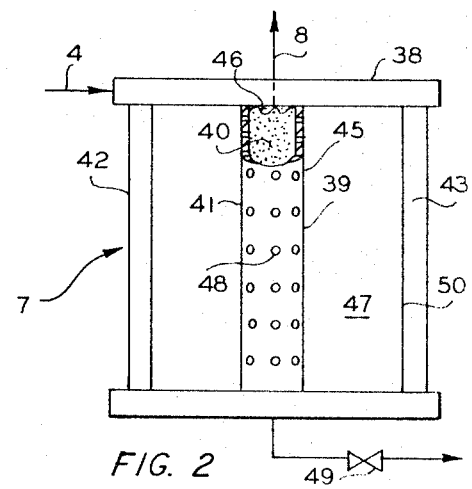
FIG. 2 is a diagrammatic view of the osmotic treating unit 7 of FIG. 1.

As shown in FIG. 2, osmotic treating unit 7 has an upper end 38 with conduit 39 disposed therein to permit introduction to fluid to the inner section 40 thereof. Conduit 39 is positioned in upper end 38 and extends downwardly through the axis of unit 7. The portion of conduit 39 located inside chamber 42 is perforated to permit flow of fluid from the exterior annulus or zone 43 formed by the chamber wall and the outer surface of the medium 47 to the internal zone or annulus 40. The perforations can be of any shape, such as slits or round holes, but should be of a diameter smaller than that of the granules forming filter bed 45 within the annulus 40. Annulus 40 is maintained in place by means of a support member 46 which is a mesh screen of sufficiently fine mesh to retain the filter bed medium 45, such as particulate activated carbon. The chamber 42 of unit 7 is substantially filled with a microporous, semipermeable cellulose acetate membrane or medium 47, as shown, which is generally disposed around a section of conduit 39 as shown by wrapping a length of this material about the midsection of the conduit until sufficient material has been placed thereon to essentially fill the interior of unit 7 but providing for annulus 43. The pores in the cellulose medium are generally in a diameter range of from 5 to 25 A., preferably 5 to 20 A.

In operation, water entering through conduit 4 passes spirally downwardly along the outer circumference of the cellulose acetate medium 47 whereupon a portion thereof proceeds inwardly through the cellulose medium toward conduit 39, where it passes through the openings 48 therein, travels upwardly through the charcoal filter medium 45 and exits from the unit 7 through conduit 8 to fluid storage zone 33.

In operation, unit 7 serves to remove 90 to 98 percent of the dissolved minerals, including fluorides, and all organics over 200 molecular weight, including bacteria, viruses and pyrogens. Water removed from the unit 7 contains only sufficient salts to remain passive and therefore will not corrode metals such as bronze or stainless steel. However, steel and galvanized pipe should not be used in the system. The rate of flow of purified water from the system is dependent, of course, on the size of osmotic treating unit employed. In operation, excess water which does not pass through the membrane 47 is removed via conduit 19 from the unit.

Periodically, unit 7 should be flushed to remove built-up impurities therein. This action is readily achieved by opening valve 49 which permits total flow of fluid entering through conduit 4 to bathe the exposed outer surface of the cellulose acetate medium, thus removing the deposits of materials therefrom. Similarly, deposits accumulated in the lower portion of the unit are removed by the pressure of water passing through the system. Following flushing, valve 19 is returned to a closed position whereby flow is restricted, thus directing or effecting flow of water inwardly toward section 41 of conduit 39.

In a further embodiment of this invention as shown in FIG. 1, automatic chlorinator 51 is associated with the fluid inlet line to permit chlorine to be automatically dispersed in the system. The added chlorine assists in decontaminating the incoming fluid and, additionally, promotes the life of the microporous cellulose acetate medium. The chlorinator 51 operates by having a dispensing microvalve 52 disposed in conduit 53 in communication with a source of chlorine. The dispensing valve 52 is so adapted as to be actuated at predetermined periodic intervals to continually introduce chlorine into the fluid entering the unit 7. Generally an amount ranging from 0.1 to 1 gram per gallon of fluid entering the unit is dispersed through the chlorinator unit. Preferably, the chlorinator is of the type which utilizes a battery power source 54 for activation of the valve 52, which permits its ready adaptation to the purification-storage-dispensing system as a self-contained unit, thereby avoiding the necessity of using outside current. However, ordinary 220V current can be used, particularly in systems having a cooling or heating unit disposed therein as described in FIG. 3.

Figure 3:
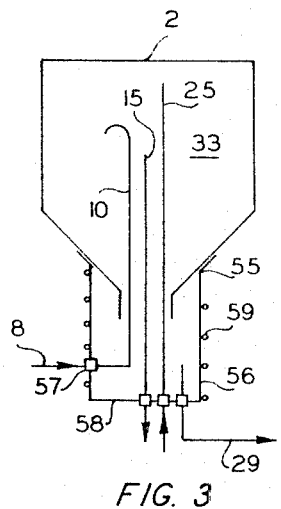
FIG. 3 is a diagrammatic view of the system of the invention having a fluid reservoir disposed therein.

In another embodiment of the invention, as shown in FIG. 3, a reservoir 56 is provided below and in open communication with the liquid storage chamber 2. In this arrangement, conduit 8 is introduced through a seal member 57 positioned in the wall 58 of the reservoir 56 and extends thereafter upwardly into storage zone 33. Similarly, dispensing conduit 29, overflow conduit 15 and air-introducing conduit 25 are disposed through the wall 58 of reservoir 56. In addition, heating or cooling elements such as coil members 59 are provided around the reservoir 56 as shown or are disposed therein to provide for the cooling and/or heating of the fluid as desired. Alternatively, a dual reservoir system can be utilized to provide both hot and cold fluid. When so arranged, a separate outlet for each reservoir should be provided. Additionally, a further conduit should be added to the hot reservoir to introduce air thereto. In assembling this embodiment of the invention, care should be taken to ensure that the fluid chamber 2 forms a watertight seal with the wall of the fluid reservoir 56. In forming a system as above described, the fluid chamber 2 can be a conventional 2- to 5-gallon type water bottle having the outer periphery of its mouth section sealingly connected to or abutting the upper end 55 of wall 58 of the reservoir 56. The various conduits 10, 15, 25 and 29 are disposed therein in the manner as described.

Figure 4:
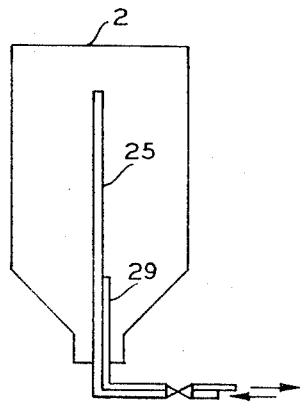
FIG. 4 is a diagrammatic view of a modified conduit system for use in the overall system of the invention.

As a further embodiment of this invention, as shown in FIG. 4, conduit 25 can be disposed in operable association with valve 32 whereby activation of valve 32 causes the opening of conduits 29 and 25 thereby permitting simultaneous removal of the stored fluid from zone 33 and introduction of equalizing air pressure into the upper end of zone 33 through conduit 25.

Figure 5:
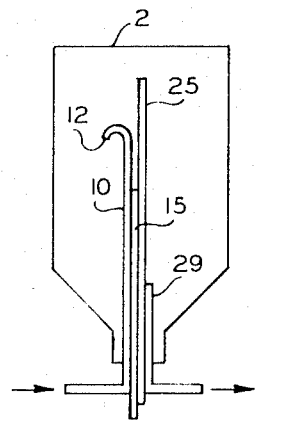
FIG. 5 is a diagrammatic view of a modified fluid dispensing conduit.

Similarly, as shown in FIG. 5, while the storage system of the invention has been illustrated by the separate passage of conduits 25, 10, 15 and 29 through seal member 13, it is contemplated as within the scope of the invention that a single conduit having the desired separate passage annulus formed therein can be employed as shown in constructing the overall treating-storage-dispensing system.

The following examples are presented to illustrate further the invention, but it is not intended that they should unduly limit the scope thereof.

EXAMPLE I

A 400-milliliter sample of water having passed through the system as described herein was tested for the presence of pyrogensthu (1) according to the procedure outlined in the U. S. P. XVII and was found to be pyrogen-free when injected 10 ml/Kg undiluted intravenously into healthy animals. None of the animals exhibited signs of ill effect during the performance of the test. The following results were achieved:

| Animal No. | Weight, Kg | Control temp., °C. | Temp. 1 hour after injection | 2 hours | 3 hours | Temp. rise, °C. |
|---|---|---|---|---|---|---|
| 1 | 2.0 | 39.2 | 39.4 | 39.4 | 39.4 | 0.2 |
| 3 | 2.5 | 39.1 | 39.2 | 39.4 | 39.3 | 0.3 |
| 3 | 2.2 | 39.5 | 39.6 | 39.8 | 39.6 | 0.3 |

The above data show that the water treatment of the inventive system produces a 100 percent pyrogen-free water.

(1) Pyrogens are organic molecules or compounds which cause elevation in body temperature when introduced to the bloodstream. Such compounds are common in water and present a serious problem when water containing them is used in preparing intravenous solutions. Pyrogens are the waste products of bacteria and yeasts. They are a polysaccharide compound with a nitrate or phosphate radical. They are gram-negative and are soluble in water. Such compounds have a size of from 0.05 to 1 micron.

EXAMPLE II

A 1-gallon sample of water was collected from the fluid treating system as described herein and subjected to analysis. The following results were obtained:

Specific conductance
(micromho/cm at 25° C.) = 20.9
pH                6.78
Silica             7.5 ppm Chief mineral constituents, ppm:
Calcium           0.84
Magnesium         0.11
Sodium            4.22
Potassium         0.80
Carbonate         0.00
Bicarbonate 8.41
Sulfate trace    <0.3
Chloride          1.79
Nitrate           0.60
Fluoride          0.10

| Calculated Values: | ppm |
|---|---|
| Total alkalinity | 6.90 |
| Total hardness | 2.55 |
| Temporary hardness | 2.55 |
| Permanent hardness | 0.00 |
| Total solids | 16.39 |
| Corrosion index (—) | 3.80 |

The above analysis shows that water resulting from the system of the present invention meets the purification level required by the United States Public Health Service standards.

Reasonable variation and modifications can be made or practiced within the foregoing disclosure without departing from the spirit and scope thereof.

I claim:

1. An automatic fluid treating system which comprises, in combination:

first conduit means to introduce a fluid into an osmotic fluid treating means;

an osmotic fluid treating means so adapted as to receive fluid from said first conduit means and to remove contaminants therefrom which pass inwardly through said fluid treating means;

a fluid storage means positioned above said osmotic fluid treating means to receive fluid from said fluid treating means;

second conduit means having the first end thereof adapted to receive the resulting treated fluid from said treating means and to introduce same through a second end thereof into said fluid storage means;

third conduit means having a first end thereof opening within said osmotic fluid treating means and so adapted as to remove untreated fluid from said osmotic fluid treating means;

fourth conduit means to permit removal of stored fluid from said fluid storage means;

first valve means disposed within said fourth conduit means to regulate flow of fluid from said fluid storage means; and sealing means for said fluid storage means, said sealing means being so adapted as to permit the passage of said second and fourth conduit means therethrough and to maintain said conduits in a substantially upright position.

2. The system according to claim 1 wherein there is additionally provided a fifth conduit means having a first end thereof disposed within said fluid storage chamber and the lower end outside said fluid storage chamber whereby overflow from said fluid storage chamber is removed.

3. The system according to claim 2 wherein there is provided a sixth conduit means having the upper end thereof disposed above the fluid level in said fluid storage chamber and the lower end thereof disposed outside said fluid storage chamber whereby pressure in said fluid storage chamber is equalized upon activation of said first valve means.

4. The system according to claim 3 wherein a filter means is provided in operable association with the lower end of said sixth conduit means.

5. A system according to claim 2 wherein third valve means is disposed in said fifth conduit means to prevent backflow of fluid into said fluid storage means and wherein said fifth conduit means passages through said sealing means.

6. A system according to claim 5 wherein said third conduit means communicates with said fifth conduit means whereby excess fluid is removed from said fluid treating means.

7. A system according to claim 6 which is disposed at least partially within a housing for same.

8. A system according to claim 1 wherein a second valve means is disposed within said first conduit means and in operable association with a liquid level control means disposed in said fluid storage means whereby said second valve means is actuated in response to variation from a predetermined liquid level of fluid within said fluid storage means.

9. A system according to claim 1 wherein said second conduit means terminates at the upper end thereof in a configuration whereby the outlet of said conduit is disposed in a substantially downward position.

10. A system according to claim 1 wherein said fluid treating means is comprised of a filter medium-containing chamber means having a filter medium disposed therein circumferentially wrapped about a perforated conduit means having a first end thereof in operable association with said second conduit means, inlet means adapted to receive fluid from said first conduit means and to deliver said fluid along the outer periphery of said filter medium, outlet means adapted to permit the removal of excess untreated fluid from said chamber means and introduction thereof into said third conduit means.

11. A system according to claim 10 wherein said filter medium is formed of microporous cellulose acetate membrane.

12. A system according to claim 1 having a dispensing means disposed in operable association with said first conduit means for the introduction of a material into said first means, said dispensing means comprising a storage chamber for material to be dispensed therefrom, seventh conduit means having a first end thereof in association with said storage chamber and a second end thereof in association with said first conduit means, and fourth valve means disposed in said seventh conduit means to regulate flow from said storage chamber to said first conduit means.

13. A system according to claim 1 wherein at least one fluid reservoir is disposed below and in communication with said fluid storage chamber, and said second, fourth, fifth and sixth conduit means sealably pass through the walls defining said fluid reservoir.

14. A system according to claim 13 wherein said reservoir has heat exchange means disposed adjacent to and in heat exchange association with said wall defining said fluid reservoir.

15. A system according to claim 13 wherein said fluid storage means is formed of glass and has a lower end thereof so adapted as to form a neck area extending downwardly into and open to said fluid reservoir and wherein the upper end of said reservoir means sealably abuts said fluid storage means.

* * * * *